(12) United States Patent
Hofmanninger

(10) Patent No.: US 12,444,788 B2
(45) Date of Patent: Oct. 14, 2025

(54) THERMAL MANAGEMENT SYSTEM FOR A MOTOR VEHICLE, AND MOTOR VEHICLE HAVING SUCH A THERMAL MANAGEMENT SYSTEM

(71) Applicant: Bayerische Motoren Werke Aktiengesellschaft, Munich (DE)

(72) Inventor: Stefan Hofmanninger, Weibern (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/839,821

(22) PCT Filed: May 8, 2023

(86) PCT No.: PCT/EP2023/062127
§ 371 (c)(1),
(2) Date: Aug. 20, 2024

(87) PCT Pub. No.: WO2023/217702
PCT Pub. Date: Nov. 16, 2023

(65) Prior Publication Data
US 2025/0112297 A1 Apr. 3, 2025

(30) Foreign Application Priority Data

May 10, 2022 (DE) .................. 10 2022 111 656.5

(51) Int. Cl.
*H01M 10/613* (2014.01)
*B60K 11/04* (2006.01)
(Continued)

(52) U.S. Cl.
CPC ......... *H01M 10/6569* (2015.04); *B60K 11/04* (2013.01); *H01M 10/613* (2015.04);
(Continued)

(58) Field of Classification Search
CPC .......... H01M 10/6569; H01M 10/613; H01M 10/625; H01M 10/66; B60K 11/04; B60L 50/60
(Continued)

(56) References Cited

U.S. PATENT DOCUMENTS 6,651,761 B1 * 11/2003 Hrovat .................... B60L 15/20
165/41
8,215,432 B2 * 7/2012 Nemesh .............. H01M 16/006
429/62
(Continued)

FOREIGN PATENT DOCUMENTS

DE   10 2015 218 825 A1   3/2017
DE   10 2019 109 796 A1   12/2019
(Continued)

OTHER PUBLICATIONS

International Search Report (PCT/ISA/210) issued in PCT Application No. PCT/EP2023/062127 dated Aug. 30, 2023 with English translation (5 pages).
(Continued)

*Primary Examiner* — Hau V Phan
(74) *Attorney, Agent, or Firm* — Crowell & Moring LLP

(57) ABSTRACT

A thermal management system for a motor vehicle includes a drive motor, a first connection having a first valve device, a radiator, a second connection having a second valve device, a motor circuit pump, a chiller, and a traction battery. The second valve device is switchable in such a way that, in addition to a first radiator bypass, a second radiator bypass can also be realized. A motor vehicle having such a thermal management system is also disclosed.

8 Claims, 16 Drawing Sheets

(51) Int. Cl.
*H01M 10/625* (2014.01)
*H01M 10/6569* (2014.01)
*H01M 10/66* (2014.01)
*B60L 50/60* (2019.01)

(52) U.S. Cl.
CPC ......... *H01M 10/625* (2015.04); *H01M 10/66* (2015.04); *B60L 50/60* (2019.02); *H01M 2220/20* (2013.01)

(58) Field of Classification Search
USPC .......................................................... 180/68.4
See application file for complete search history.

(56) References Cited

U.S. PATENT DOCUMENTS

| | | | | |
|---|---|---|---|---|
| 10,371,041 | B2* | 8/2019 | Toyama | F01P 7/16 |
| 11,274,595 | B1* | 3/2022 | Farhat | F01P 5/02 |
| 2004/0069546 | A1* | 4/2004 | Lou | F01P 7/167 |
| | | | | 180/65.265 |
| 2013/0255604 | A1* | 10/2013 | Rollinger | F01P 7/165 |
| | | | | 123/41.15 |
| 2018/0134123 | A1 | 5/2018 | Herbolzheimer et al. | |
| 2019/0093546 | A1* | 3/2019 | Takagi | F01P 7/167 |
| 2019/0366800 | A1 | 12/2019 | Durrani et al. | |
| 2020/0023709 | A1* | 1/2020 | Schroeder | F25B 40/00 |
| 2020/0298662 | A1* | 9/2020 | Herbolzheimer | B60H 1/00899 |
| 2020/0300550 | A1* | 9/2020 | Hall | F28D 15/06 |
| 2021/0086583 | A1* | 3/2021 | Chatham | B60H 1/00921 |
| 2021/0245572 | A1* | 8/2021 | Hwang | B60H 1/00885 |
| 2021/0323377 | A1* | 10/2021 | Shin | B60H 1/3228 |
| 2023/0406072 | A1 | 12/2023 | Allgaeuer et al. | |
| 2024/0387504 | A1* | 11/2024 | Chen | H10D 89/10 |

FOREIGN PATENT DOCUMENTS

| | | |
|---|---|---|
| DE | 10 2021 117 787 A1 | 10/2021 |
| DE | 10 2021 123 953 A1 | 3/2023 |
| DE | 10 2021 127 770 A1 | 4/2023 |

OTHER PUBLICATIONS

German-language Written Opinion (PCT/ISA/237) issued in PCT Application No. PCT/EP2023/062127 dated Aug. 30, 2023 with English translation (12 pages).

German-language Search Report issued in German Application No. 10 2022 111 656.5 dated May 5, 2023 with partial English translation (10 pages).

Grant Decision for German Application No. 10 2022 111 656.5 dated Jul. 3, 2023, with C1 English translation (8 pages).

* cited by examiner

THERMAL MANAGEMENT SYSTEM FOR A MOTOR VEHICLE, AND MOTOR VEHICLE HAVING SUCH A THERMAL MANAGEMENT SYSTEM

BACKGROUND AND SUMMARY

The present disclosure relates to a thermal management system having a temperature-control circuit and having a refrigeration circuit which interacts therewith. The thermal management system serves for controlling the temperature of vehicle components and for controlling the temperature of a vehicle passenger compartment. The present disclosure furthermore relates to a motor vehicle having such a thermal management system.

The German Patent Application 10 2021 127 770.1 is directed at a thermal management system. If, in said thermal management system (see for example FIG. 22), quick heating of one or more drive motors 35 is desired, then it is possible for there to be formed a temperature-control circuit in which the radiator 32 is bypassed, so that the heat remains in the temperature-control circuit. This bypassing of the radiator 32 can be achieved by forming a bypass of the radiator 32 via a connecting line 56, a battery pump 43, a battery bypass line 54 and a valve 141. However, in this case, it has been found that, during this warm-up phase, little heat energy is available for heating a vehicle passenger compartment because the drive motors 35, on account of their high thermal masses, can absorb a very large amount of heat energy, which can then no longer be available for heating a vehicle passenger compartment.

It is therefore an object of the present disclosure to at least partially overcome the above-stated disadvantage. Said object is achieved by a thermal management system and by a motor vehicle according to the present disclosure. Advantageous refinements also form the subject matter of the present disclosure.

According to an exemplary embodiment of the present disclosure, provision is made of a thermal management system for a motor vehicle, having a motor circuit in which at least one drive motor, a first connection or a first junction point, a radiator, a second connection or a second junction point, and a motor-circuit pump are arranged in series; having a battery line which has a chiller and, in series therewith, a bypass/battery parallel connection with a traction battery and with a battery bypass parallel thereto, wherein the chiller is able to be flowed through from a refrigeration circuit in a manner separated fluidically from the battery line; wherein the first connection is arranged in the motor circuit downstream of the drive motor and upstream of the radiator, and, at the first connection, selectively, coolant is introducible into the battery line by a first valve device; wherein the second connection is arranged downstream of the radiator and upstream of the drive motor, and, at the second connection, there is arranged a second valve device by which, selectively, coolant is conductable to the drive motor and/or the chiller and the traction battery are connectable to form a ring-like battery circuit, and having a third connection between the battery line and the motor circuit, wherein the chiller is arranged in the battery line between the first connection and the third connection, wherein a first radiator bypass is able to be formed via the third connection, the battery bypass and the second connection. The thermal management system also has a second radiator bypass which branches off from the motor circuit downstream of the drive motor and upstream of the radiator and opens into the motor circuit downstream of the radiator and upstream of the drive motor. This has the advantage that, as a result of the second radiator bypass, there is created a separate possibility of bypassing the radiator for the drive motor, this being particularly advantageous for a quick warm-up operation of the drive motor due to the creation of a circuit in which self-heating of the drive motor is possible while the heat energy of the drive motor is kept in said circuit and is not released to the surroundings. This can be enhanced by the second radiator bypass being designed with a smaller flow cross section in comparison with the first radiator bypass, so that the circulated coolant is heated even more quickly. Moreover, it is in this way possible for the first radiator bypass to be used in some other way, for example for forming a battery circuit for heating a vehicle passenger compartment by an electric heater situated in the battery circuit.

According to a further exemplary embodiment of the present disclosure, an electric heater is arranged in the battery line. This allows heat energy to be generated if the waste heat of heat sources, such as for example the drive battery or the drive motors, is not sufficient.

According to a further exemplary embodiment of the present disclosure, the second radiator bypass is free of heat sinks or heat sources. In other words, the second radiator bypass is exclusively a line in the form of a tube, a pipeline or a passage in a block of material or the like.

In particular, the second radiator bypass opens into the second connection.

According to a further exemplary embodiment of the present disclosure, a battery pump is also arranged in the battery line. Thus, a second coolant pump is available, so that two circuits which are independent of one another can be formed.

According to a further exemplary embodiment of the present disclosure, the thermal management system is also equipped with a condenser line which runs between the second connection and the first connection, wherein the condenser line has a condenser and the condenser, fluidically separated from the condenser line, is also able to be flowed through from the refrigeration circuit. This incorporation of the liquid-cooled condenser makes possible heating of the traction battery with bypassing of the radiator.

According to a further exemplary embodiment of the present disclosure, the second valve device has at least three switching positions, wherein, in a first switching position, the battery line is connected in series with the drive motor, and, in a second switching position, the chiller and the bypass/battery parallel connection are able to be connected to form the battery circuit that is closed in a ring-like manner and the second radiator bypass is blocked, and, in a third switching position, the chiller and the bypass/battery parallel connection are able to be connected to form the battery circuit that is closed in a ring-like manner and the second radiator bypass is connected in series with the drive motor.

The present disclosure furthermore provides a motor vehicle having such a thermal management system.

A preferred exemplary embodiment of the present disclosure will be described below with reference to the appended drawings.

DETAILED DESCRIPTION OF THE DRAWINGS

Figure 1:
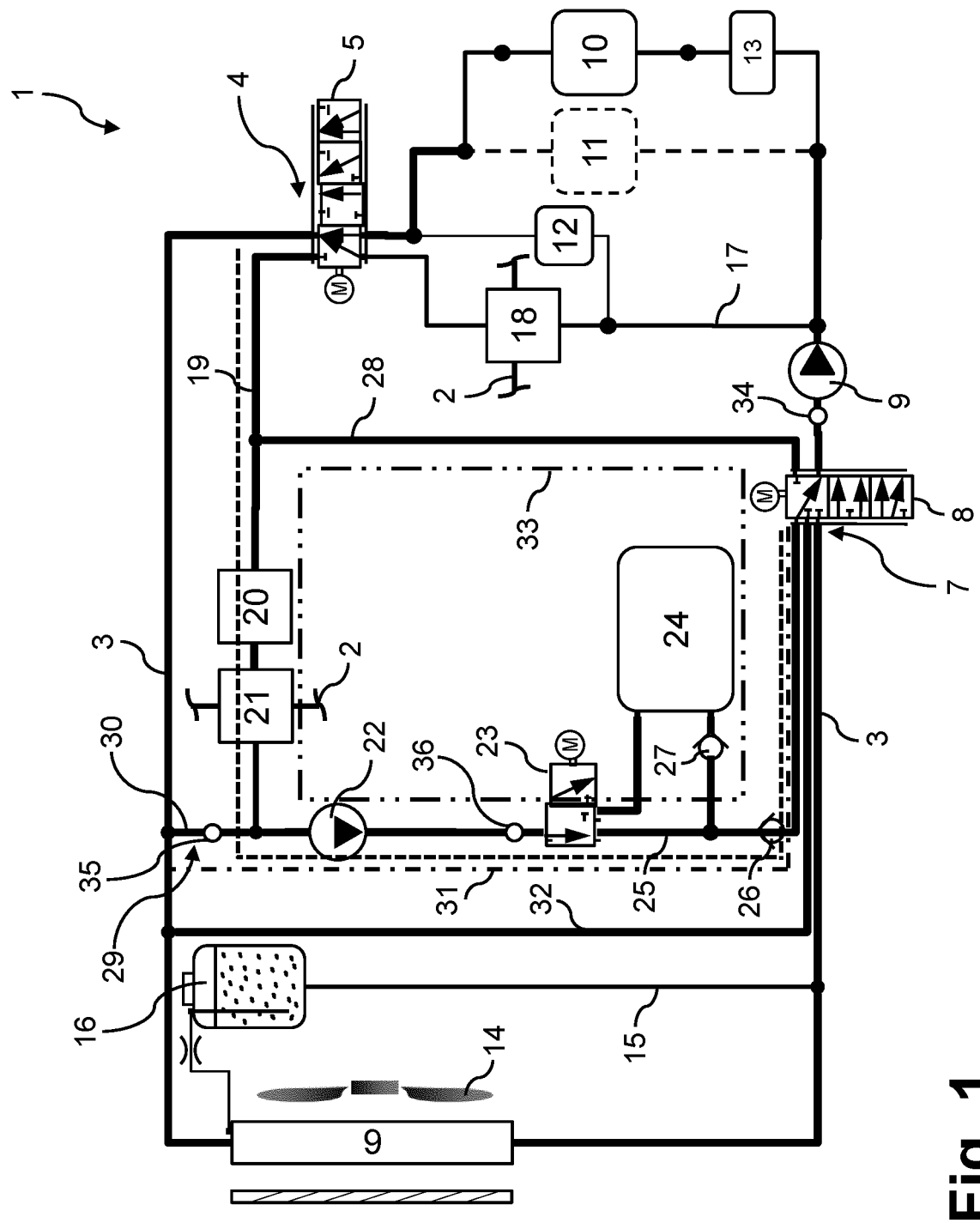
FIG. 1 shows a temperature-control circuit according to a first exemplary embodiment of the present disclosure.

FIG. 1 shows a temperature-control circuit 1 according to an exemplary embodiment of the present disclosure. This may be installed in an electrified motor vehicle (not illustrated), in particular a passenger motor vehicle. In this case, the temperature-control circuit 1 interacts with a refrigeration circuit 2, which is merely indicated in FIG. 1. In detail, for the refrigeration circuit 2, use may be made for example of one of the refrigeration circuits known from DE 10 2021 117 787 A1 or a similar refrigeration circuit.

The temperature-control circuit 1 comprises a motor circuit 3 in which a first connection 4 (in the form of a first valve device 5), a radiator 6, a second connection 7 (in the form of a second valve device 8), a motor-circuit pump 9, and a drive parallel connection, composed of a first drive motor 10, optionally of a second drive motor 11, and of a first power-electronics component 12, are arranged in series such that, with corresponding switching-through of the first and second valve devices 5, 8, these components form a closed circuit in which, with activated motor-circuit pump 9, coolant is able to be circulated, the coolant being for example water provided with additives.

A second power-electronics component 13 is connected in series upstream of the first drive motor 10. Consequently, the drive parallel connection comprises the first drive motor 10, optionally a second drive motor 11, the power-electronics component 12 and the power-electronics component 13. The drive motor 10 and the power-electronics component 13 are arranged in series with one another. This series connection, optionally a second drive motor 11 and the power-electronics component 12 are connected in parallel with one another. The first and second power-electronics component 12, 13 may in each case be a component from a vehicle-internal charging unit, from an inverter, from a DC/DC converter or from a control unit, for example.

A fan 14 is assigned to the radiator 6 in a known manner. Furthermore, an expansion-tank line 15 branches off from the radiator 6 and has an expansion tank 16 and opens into the motor circuit 3 at a point downstream of the radiator 6 and upstream of the second connection 7.

A flow direction of the coolant is predefined by the conveying direction of the motor-circuit pump 9.

A condenser line 17 is provided between the second connection 7 and the first connection 4. In particular, the condenser line 17 branches off from the motor circuit 3 downstream of the motor-circuit pump 9 and leads to the first connection 4. More precisely, at the upstream end, the condenser line 17 is connected to the upstream point of the drive parallel connection. At the downstream end, the condenser line is connected to the first valve device 5, albeit by way of a different connection point of the first valve device 5 than the drive parallel connection. A condenser 18 is arranged in the condenser line 17. The condenser 18 is a heat exchanger through which refrigerant of the refrigeration circuit 2 and coolant of the temperature-control circuit 1 are able to flow. In this case, in the condenser 18, the refrigerant and the coolant are fluidically separate from one another and in heat exchange with one another. The condenser 18 is thus a so-called liquid-cooled condenser.

Arranged downstream of the drive motor 10 is the first connection 4, at which a battery line 19 branches off. The course of the battery line 19 is indicated by a dashed line in FIG. 1. In the illustrated exemplary embodiment, the first connection 4 is formed by the first valve device 5, although it should be noted that this need not necessarily be the case. In this regard, it is possible for example for the first connection 4 to also be simply a line branch and for the first valve device to be in the form of two proportional or shut-off valves (one in the battery line 19, and the other in the motor circuit 3 downstream of the first connection 4).

In the battery line 19, an electric heater 20, a chiller 21, a battery pump 22, a battery-bypass valve 23 and a bypass/battery parallel connection, composed of a traction battery 24 and a parallel battery bypass 25, and, downstream of the bypass/battery parallel connection, a first one-way valve 26 are arranged in series, in particular are arranged in series in the stated order. Downstream of the traction battery 24, a second one-way valve 27 is arranged in series with the traction battery 24 and upstream of the connection to the battery bypass 25. The one-way valve 26 permits only a flow in the direction from the battery pump 22 toward the second connection 7 and blocks a flow in the opposite direction. The one-way valve 26 permits only a flow in the direction from the battery pump 22 toward the second connection 7 and blocks a flow in the opposite direction.

The chiller 21 is a heat exchanger which transmits heat energy between the refrigerant of the refrigeration circuit 2 and the coolant of the temperature-control circuit 1. For this purpose, the refrigerant and the coolant flow through the chiller 21 fluidically separate from one another and in heat exchange with one another.

The traction battery 24 has a multiplicity of electrochemical storage cells which store electrical energy and provide the latter at least for driving the motor vehicle. Furthermore, the storage cells and thus the traction battery 24 are rechargeable. Said storage cells are temperature-controlled, that is to say heated or cooled, by a temperature-control device, for which purpose said temperature-control device is configured such that coolant is able to flow through it.

The battery-bypass valve 23 allows a coolant stream coming from the battery pump 22 to be selectively guided into the battery bypass line 25 or through the traction battery 24. It is also possible for there to be intermediate positions, so that the battery bypass line 25 and the traction battery 24 are flowed through at the same time.

The second connection 7 is provided downstream of the first one-way valve 26. At the second connection 7, the battery line 19 is selectively connectable to a point of the motor circuit 3 that is downstream of the radiator 6 and upstream of the motor-circuit pump 9.

Furthermore, provision is made of a circulation line 28 which leads from the second connection 7 back to the battery line 19 at a point between the first connection 4 and the chiller 21, in particular between the first connection 4 and the electric heater 20.

Furthermore, provision is made of a third connection 29 which, at a point between the chiller 21 and the battery pump 22, connects the battery line 19 to a point of the motor circuit 3 downstream of the first connection 4 and upstream of the radiator 6. In the illustrated exemplary embodiment, the third connection comprises a connecting line 30 without a valve, although a valve could also be provided.

A first radiator bypass 31 can be formed via the third connection 29, the battery pump 22, the battery-bypass valve 23, the battery bypass 25 and the second connection 7, the first radiator bypass being indicated by a dash-dotted line.

According to the present disclosure, provision is made of a second radiator bypass 32 which, in the illustrated exemplary embodiment, is in the form of a line which is free of heat sources or heat sinks. The second radiator bypass 32 leads from a point of the motor circuit 3 downstream of the first connection 4 and upstream of the radiator 6, more precisely from a point of the motor circuit 3 downstream of the third connection 29 and upstream of the radiator 6, to the second connection 7.

In the illustrated exemplary embodiment, the first valve device 5 is a proportional valve with the following four basic positions:

A first switching position, which is illustrated in FIG. 1, in which coolant from the condenser line 17 and coolant from the drive parallel connection are brought together and, with bypassing of the battery line 19, guided onward in the motor circuit 3 toward the third connection 29. In this first switching position, the battery line 19 is blocked at the first connection 4.

A second switching position, in which both the condenser line 17 and the battery line 19 are blocked. The coolant coming from the drive parallel connection is guided onward in the motor circuit 3 toward the third connection 29.

A third switching position, in which both the condenser line 17 and the onward flow in the motor circuit 3 toward the third connection 29 are blocked. The coolant coming from the drive parallel connection is conducted completely into the battery line 19.

A fourth switching position, in which coolant from the condenser line 17 and coolant from the drive parallel connection are brought together and guided completely into the battery line 19.

Since proportional valves are involved, intermediate positions are possible, in particular steplessly possible, so that a corresponding distribution between these basic positions is achieved.

In the illustrated exemplary embodiment, the second valve device 8 is a proportional valve with the following three basic positions:

A first switching position, which is illustrated in FIG. 1, in which coolant from the battery line 19 is conducted completely toward the motor-circuit pump 9. The circulation line 28, the second radiator bypass 32 and a line of the motor circuit 3 coming from the radiator 6 are blocked at the second connection 7.

A second switching position, in which the coolant stream coming from the battery line 19 is conducted completely into the circulation line 28, so that there is formed a battery cooling circuit 33 (marked by a dash-double-dotted line) which is able to be flowed through in a ring-like manner and in which the components of the battery line 19 are able to be flowed through by coolant in series and in the form of a ring-like circuit. The coolant stream coming from the radiator 6 is conducted completely to the motor-circuit pump 9. The second radiator bypass 32 is blocked at the second connection 7.

A third switching position, in which the coolant stream coming from the battery line 19 is conducted completely into the circulation line 28, so that the battery cooling circuit 33 able to be flowed through in a ring-like manner is formed. The coolant stream coming from the second radiator bypass 32 is conducted completely to the motor-circuit pump 9. The coolant stream coming from the radiator 6 is blocked at the second connection 7.

Since proportional valves are involved, intermediate positions are possible, in particular steplessly possible, so that a corresponding distribution between these basic positions is achieved.

Furthermore, provision is made between the second connection 7 and the motor-circuit pump 9 of a temperature sensor 34, in the connecting line 30 of a temperature sensor 35, and between the battery pump 22 and the battery-bypass valve 23 of a temperature sensor 36.

Different specific operating modes of the temperature-control circuit 1 will be discussed further below.

Figure 2:
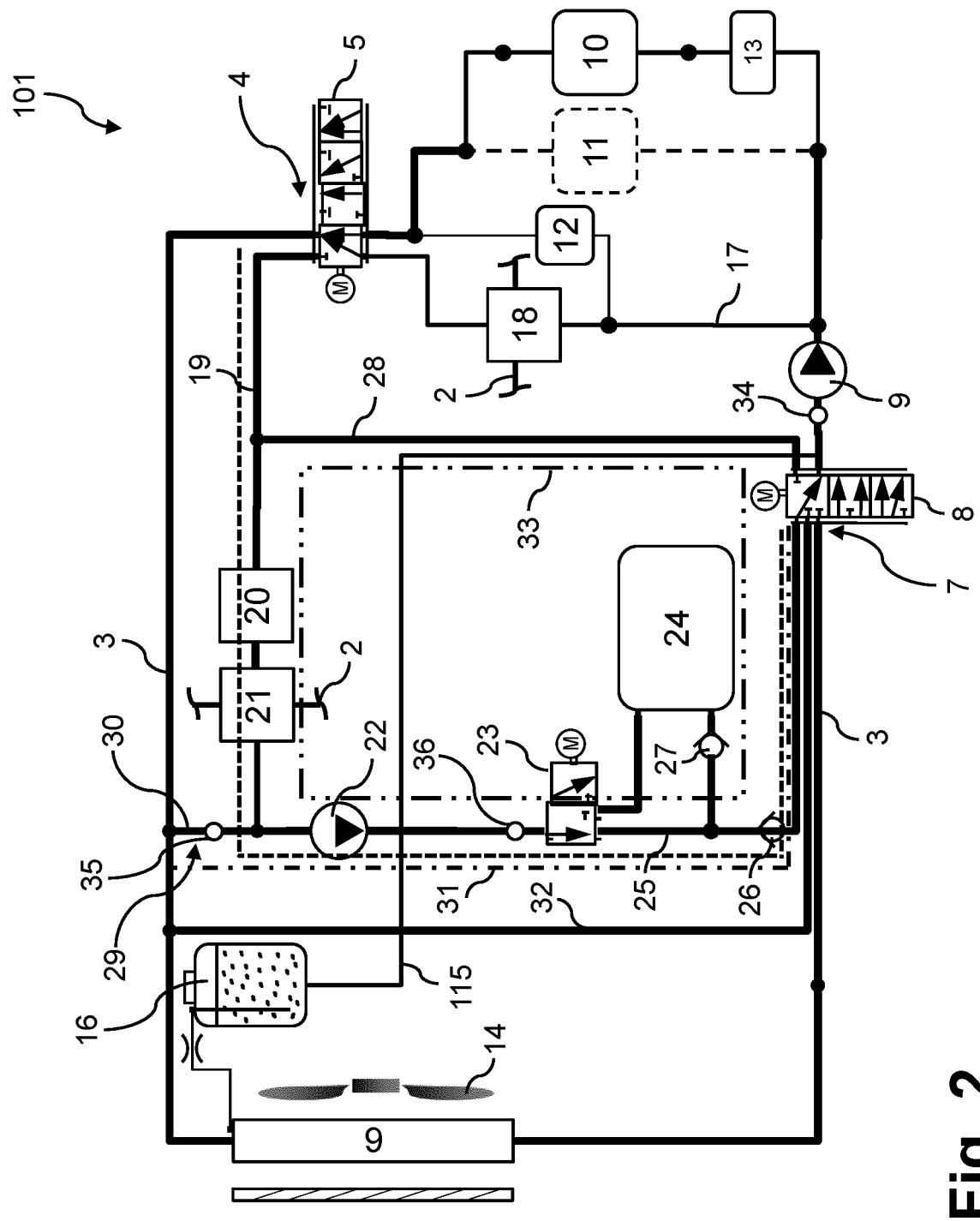
FIG. 2 shows a temperature-control circuit according to a second exemplary embodiment of the present disclosure.

FIG. 2 shows a temperature-control circuit 101 according to a second exemplary embodiment of the present disclosure. This temperature-control circuit 101 differs from the temperature-control circuit 1 from FIG. 1 only by a modified expansion-tank line 115. The latter has the expansion tank 16 and branches off from the radiator 6. The expansion-tank line 115 opens into the motor circuit 3 again at a point downstream of the second connection 7 and upstream of the motor-circuit pump 9.

Apart from this stated difference, the temperature-control circuit 101 corresponds to the temperature-control circuit 1, and for this reason reference is made to the description thereof so as to avoid repetitions.

Figure 3:
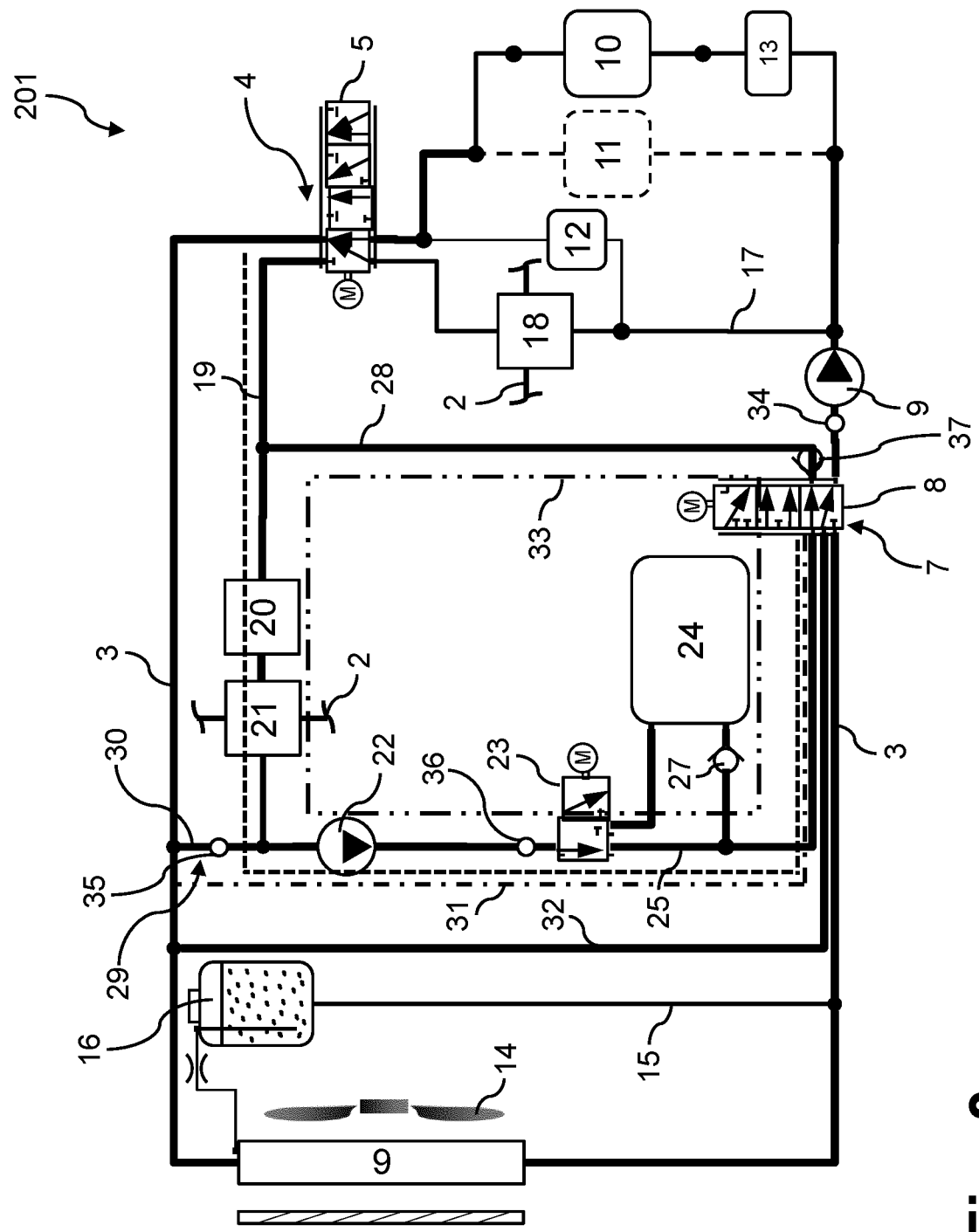
FIG. 3 shows a temperature-control circuit according to a third exemplary embodiment of the present disclosure.

FIG. 3 shows a temperature-control circuit 201 according to a third exemplary embodiment of the present disclosure. This temperature-control circuit 201 differs from the temperature-control circuit 1 from FIG. 1 only in that the one-way valve 26 has been dispensed with and, instead, a one-way valve 37 is arranged in the circulation line 28, which one-way valve permits only a flow of coolant from the second connection 7 to the point between the first connection 4 and the chiller 21.

Apart from this stated difference, the temperature-control circuit 201 corresponds to the temperature-control circuit 1, and for this reason reference is made to the description thereof so as to avoid repetitions.

Figure 4:
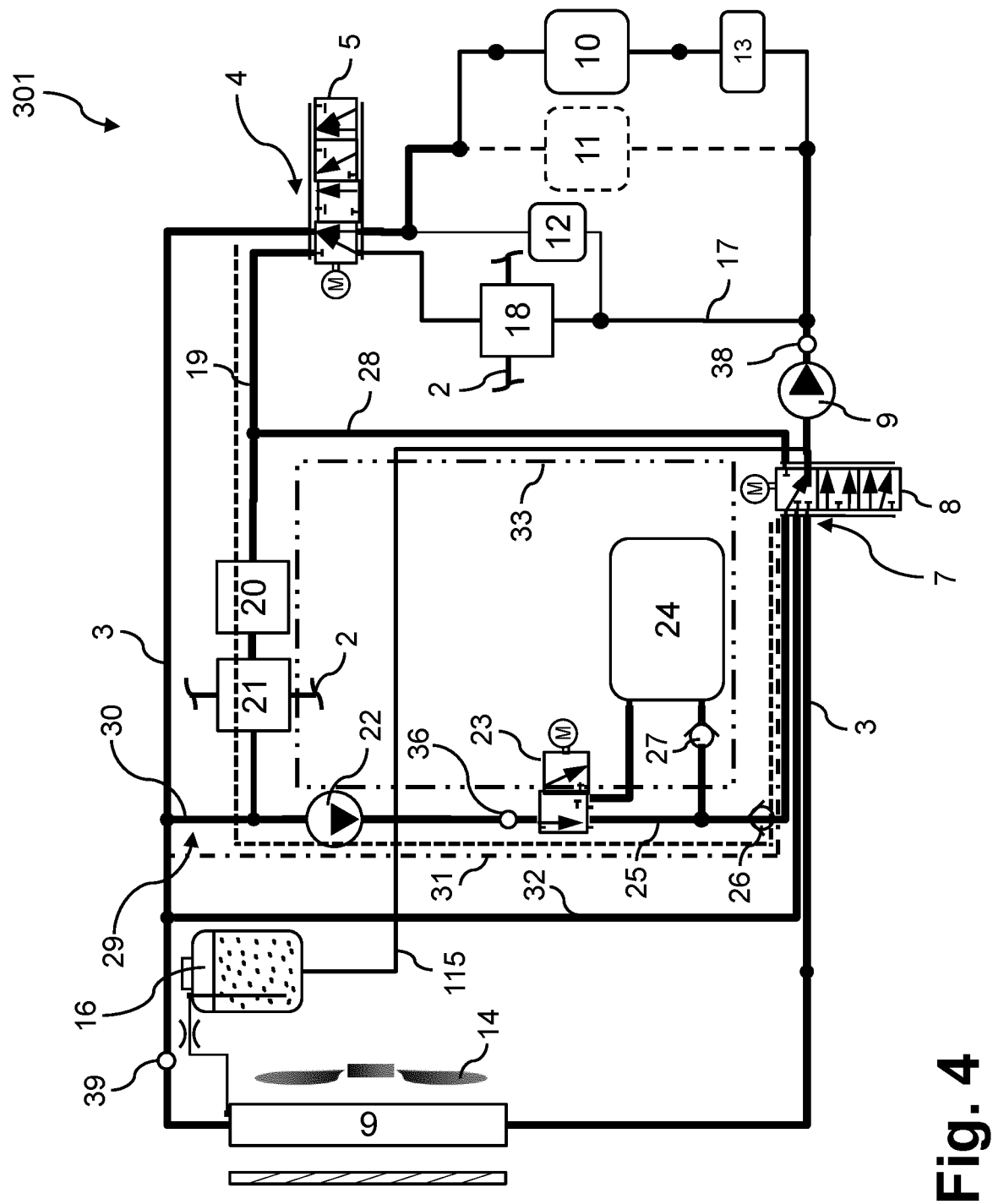
FIG. 4 shows a temperature-control circuit according to a fourth exemplary embodiment of the present disclosure.

FIG. 4 shows a temperature-control circuit 301 according to a fourth exemplary embodiment of the present disclosure. This temperature-control circuit 301 differs from the temperature-control circuit 101 from FIG. 2 only in that the temperature sensors 34 and 35 have been dispensed with. Instead, provision is made of a temperature sensor 38 between the motor-circuit pump 9 and the drive parallel connection, that is to say downstream of the motor-circuit pump 9 and upstream of the drive parallel connection. Furthermore, provision is made of a temperature sensor 39 which is provided in the motor circuit 3 at a point downstream of the branch of the second radiator bypass 32 and upstream of the radiator 6.

Apart from these stated differences, the temperature-control circuit 301 corresponds to the temperature-control circuit 101, and for this reason reference is made to the description thereof so as to avoid repetitions.

Figure 5:
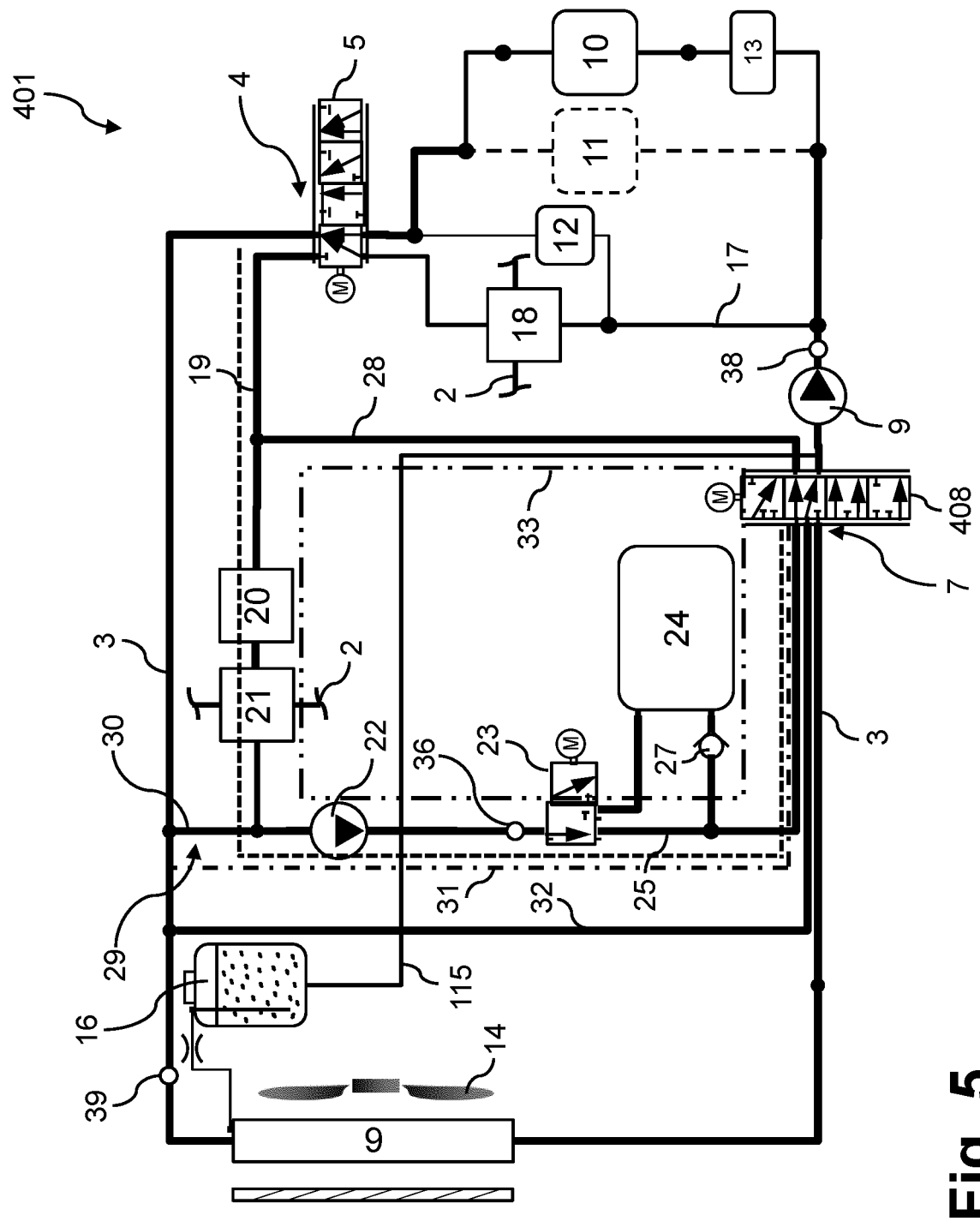
FIG. 5 shows a temperature-control circuit according to a fifth exemplary embodiment of the present disclosure.

FIG. 5 shows a temperature-control circuit 401 according to a fifth exemplary embodiment of the present disclosure. This temperature-control circuit 401 differs from the temperature-control circuit 301 from FIG. 4 in that, at the second connection 7, instead of the second valve device 8 in the form of a 5/3-way valve, in the fifth exemplary embodiment, provision is made of a second valve device 408 in the form of a 5/4-way valve. In this way, the one-way valve 26 of the fourth exemplary embodiment can be dispensed with.

In the illustrated exemplary embodiment, the second valve device 408 is a proportional valve with the following four basic positions:
- A first switching position, which corresponds to the first switching position of the second valve device 8.
- A second switching position, which corresponds to the third switching position of the second valve device 8.
- A third switching position, which corresponds to the second switching position of the second valve device 8.
- A fourth switching position, in which the coolant stream coming from the radiator 6 is conducted completely to the motor-circuit pump 9. The second radiator bypass 32 is blocked at the second connection 7. Moreover, the coolant stream coming from the battery line 19 and the circulation line 28 are blocked at the second connection 7.

Since proportional valves are involved, intermediate positions are possible, in particular steplessly possible, so that a corresponding distribution between these basic positions is achieved.

Apart from these stated differences, the temperature-control circuit 401 corresponds to the temperature-control circuit 301, and for this reason reference is made to the description thereof so as to avoid repetitions.

FIGS. 6 to 16 illustrate different operating states, all of which are able to be applied to the exemplary embodiments above. In FIGS. 6 to 16, in each case, the coolant lines illustrated as solid lines are flowed through by coolant, that is to say coolant is moving in relation to the lines. By contrast, the coolant lines illustrated by dashed lines are not flowed through or the coolant is situated in these lines in a state unmoved in relation to the lines.

Figure 6:
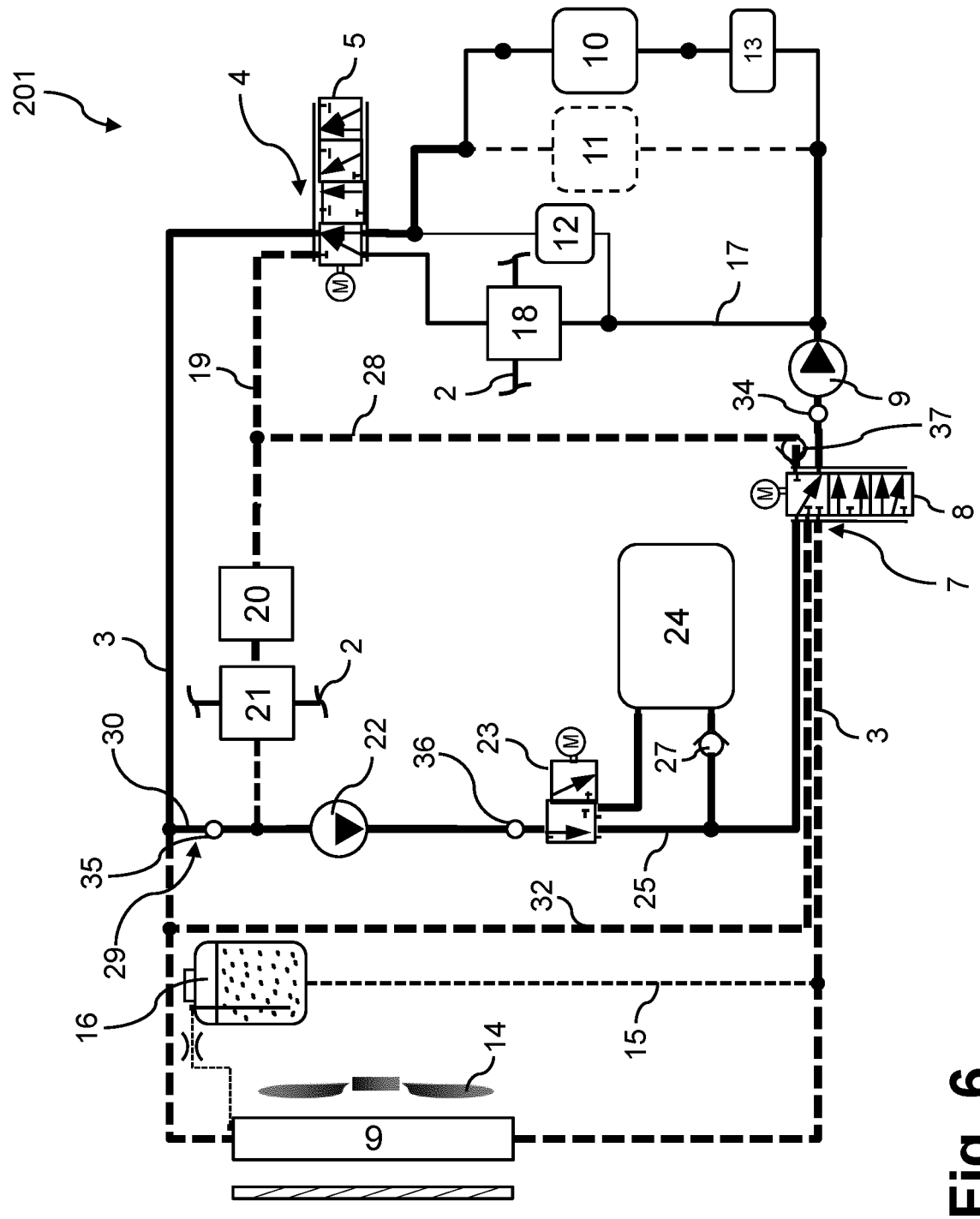
FIG. 6 shows a first operating state of the thermal management system.

FIG. 6 illustrates a first operating state on the basis of the temperature-control circuit 201. In this operating state, the first valve device 5 is in its first switching position, the second valve device 8 is in its first switching position, the motor-circuit pump 9 is active, and the battery pump 22 is active. Consequently, the condenser 18 and the drive parallel connection are connected in parallel with one another. This condenser/drive parallel connection is in series with the first valve device 5, the battery pump 22, and the bypass/battery parallel connection. The chiller 21 is bypassed in this case. Downstream, the second valve device 8 and the motor-circuit pump 9 are connected in series. The battery line 19 is blocked at the first valve device 5. Flow through the circulation line 28, the second radiator bypass 32 and the radiator 6 is likewise blocked.

This operating state may be used for example during a warm-up phase, in order to warm up the drive motors 10, 11 to an operating temperature by way of waste heat of the traction battery 24 (for example after a stationary charging operation). This operating state may also be used to heat the traction battery 24 by way of waste heat of the drive motors 10, 11 (during travel) and/or of the condenser 18 in the case of cold outside temperatures. It is in this case possible for a throughflow ratio between traction battery 24 and battery bypass 25 to be set via the battery valve 23, according to requirement.

Figure 7:
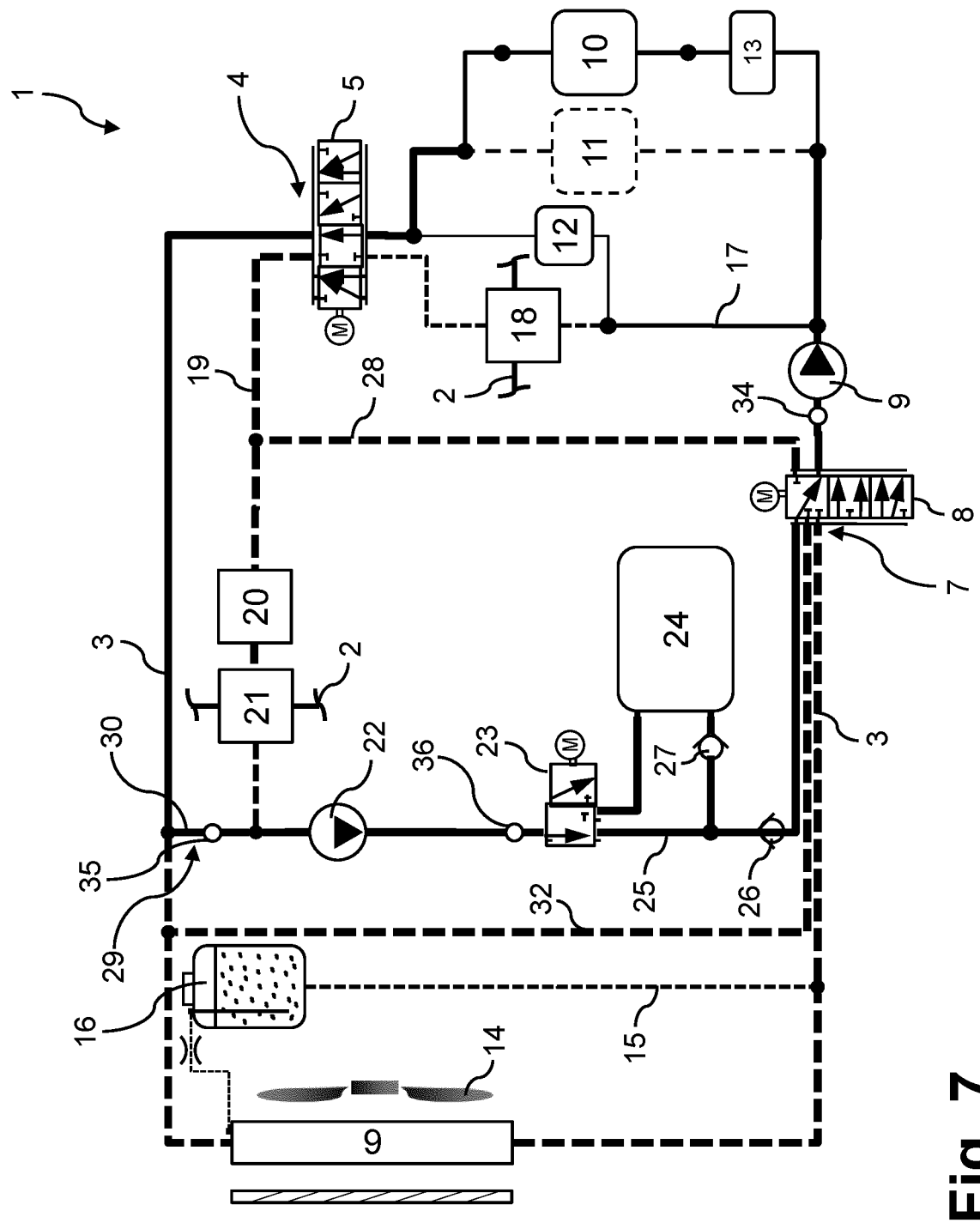
FIG. 7 shows a second operating state of the thermal management system.

FIG. 7 illustrates a second operating state on the basis of the temperature-control circuit 1. This operating state differs from the operating state from FIG. 7 only in that, in the second operating state, the condenser line 17 is blocked. Consequently, the temperature-control circuit 1 is not in heat exchange with the refrigeration circuit 2 either via the chiller 21 or via the condenser 18.

Figure 8:
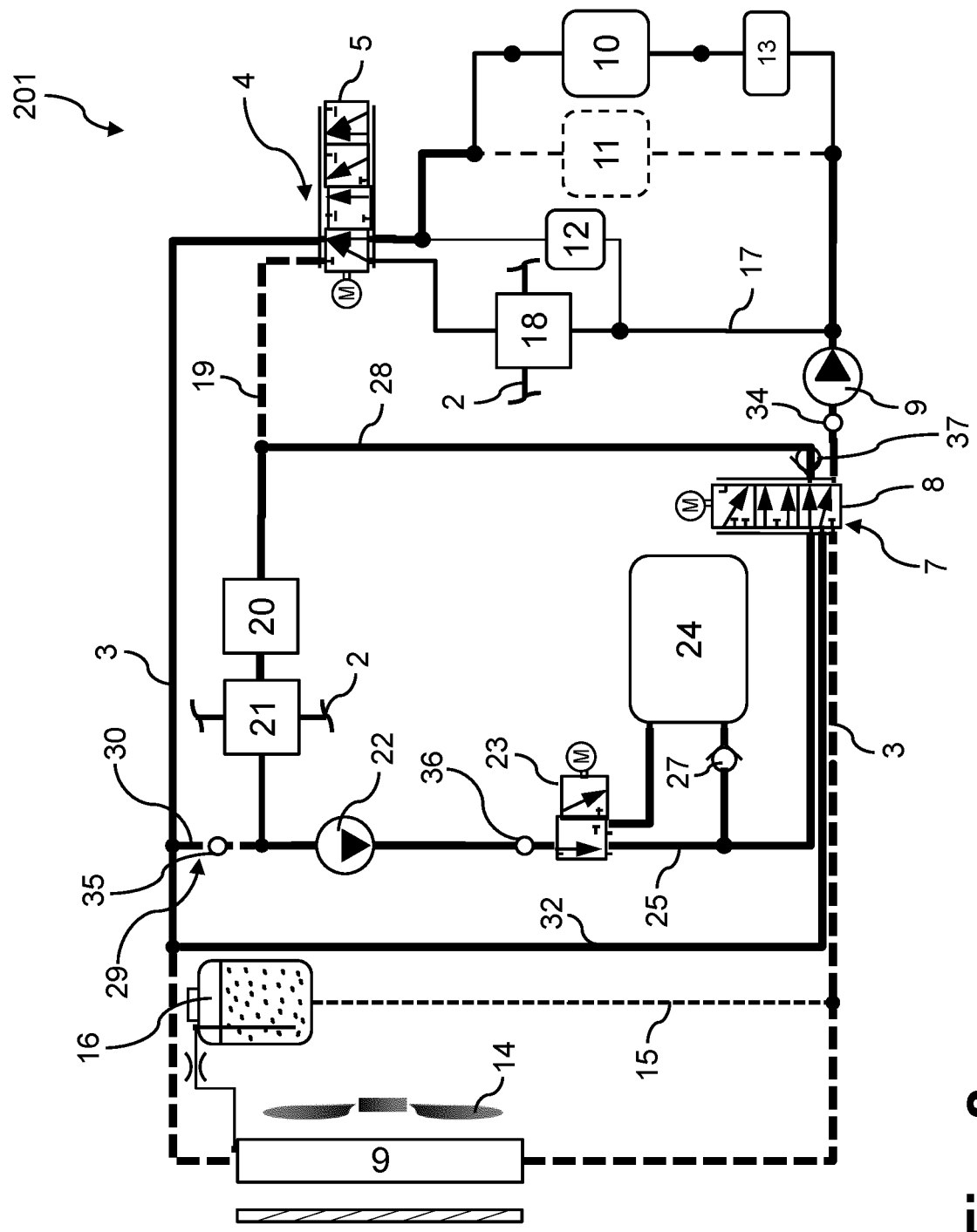
FIG. 8 shows a third operating state of the thermal management system.

FIG. 8 illustrates a third operating state on the basis of the temperature-control circuit 201. In this operating state, the first valve device 5 is in its first switching position, the second valve device 8 is in its third switching position, the motor-circuit pump 9 is active, and the battery pump 22 is active. Consequently, the condenser 18 and the drive parallel connection are connected in parallel with one another. This condenser/drive parallel connection is in series with the second radiator bypass 32 and the motor-circuit pump 9, which are flowed through in a closed circuit. Flow through the radiator 6 is blocked.

The battery circuit 33 is formed separately from this, without a significant exchange of coolant with the motor circuit 3 taking place, that is to say the battery circuit 33 is separate from the motor circuit 3 at the first and second connections 4 and 7. Substantially no exchange of coolant takes place at the third connection 29.

This operating state may be used for example during a warm-up phase, in order to warm up the drive motors 10, 11 as quickly as possible by way of their own heat plus heat energy from the condenser 18. As a result of the radiator 6 being bypassed, in this case, heat energy is prevented from being released to the surroundings but remains in the motor circuit 3.

At the same time and separately from this, in the battery circuit 33, it is possible for the traction battery to be heated by the electric heater 20 or for the refrigeration circuit 2 to be fed via the chiller 21 with heat energy for heating a vehicle passenger compartment via the refrigeration circuit 2.

Figure 9:
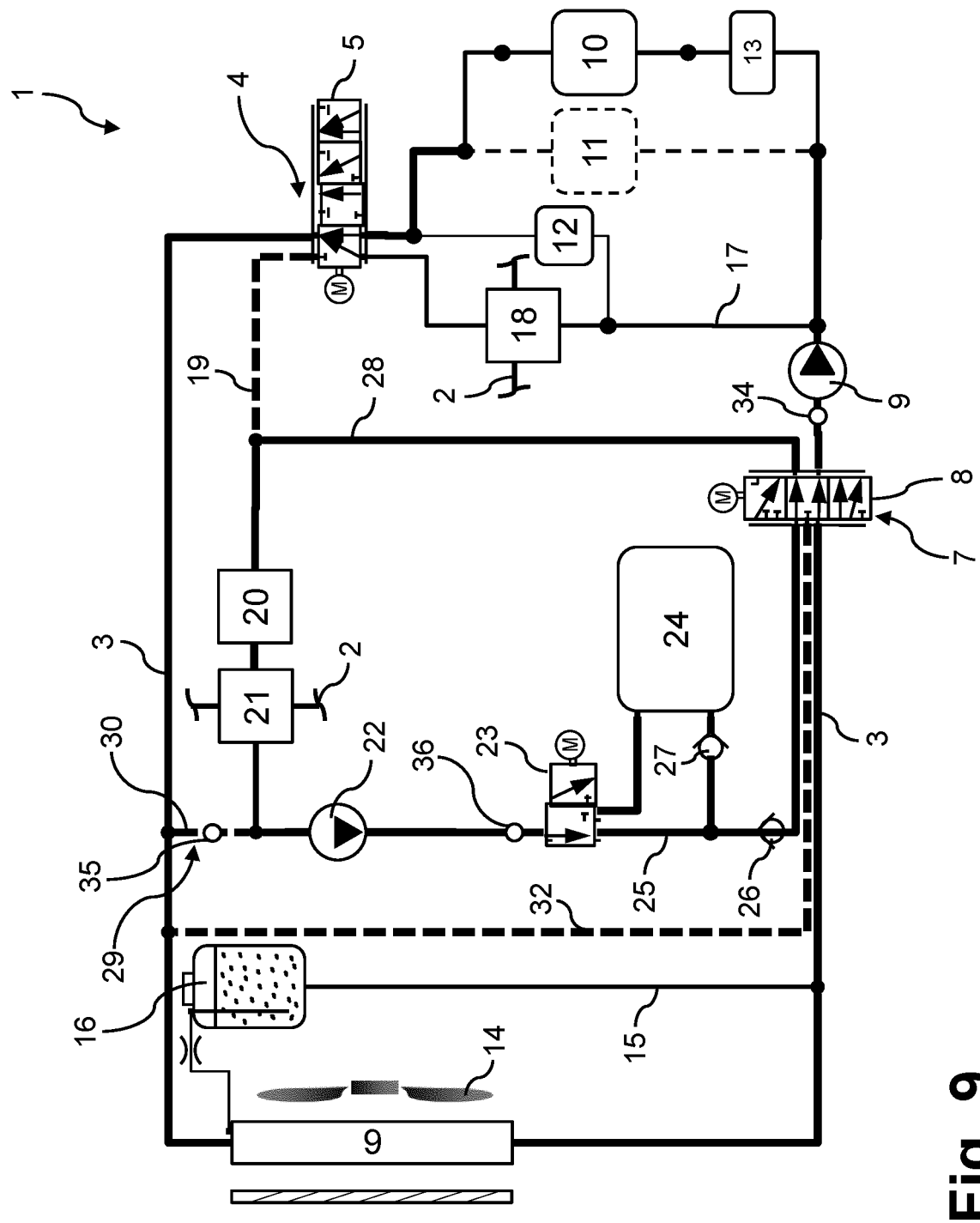
FIG. 9 shows a fourth operating state of the thermal management system.

FIG. 9 illustrates a fourth operating state on the basis of the temperature-control circuit 1. In this operating state, the first valve device 5 is in its first switching position, the second valve device 8 is in its second switching position, the motor-circuit pump 9 is active, and the battery pump 22 is active. Consequently, the condenser 18 and the drive parallel connection are connected in parallel with one another. This condenser/drive parallel connection is in series with the radiator 6 and the motor-circuit pump 9, which are flowed through in a closed circuit. Flow through the second radiator bypass 32 is blocked.

The battery circuit 33 is formed separately from this, without a significant exchange of coolant with the motor circuit 3 taking place, that is to say the battery circuit 33 is separate from the motor circuit 3 at the first and second connections 4 and 7. Substantially no exchange of coolant takes place at the third connection 29.

This operating state may be used for example to cool the drive motors 10, 11 via the radiator 6 if waste heat is to be discharged to the surroundings.

At the same time and separately from this, it is possible for the traction battery to be heated by the electric heater 20 in the battery circuit 33.

Figure 10:
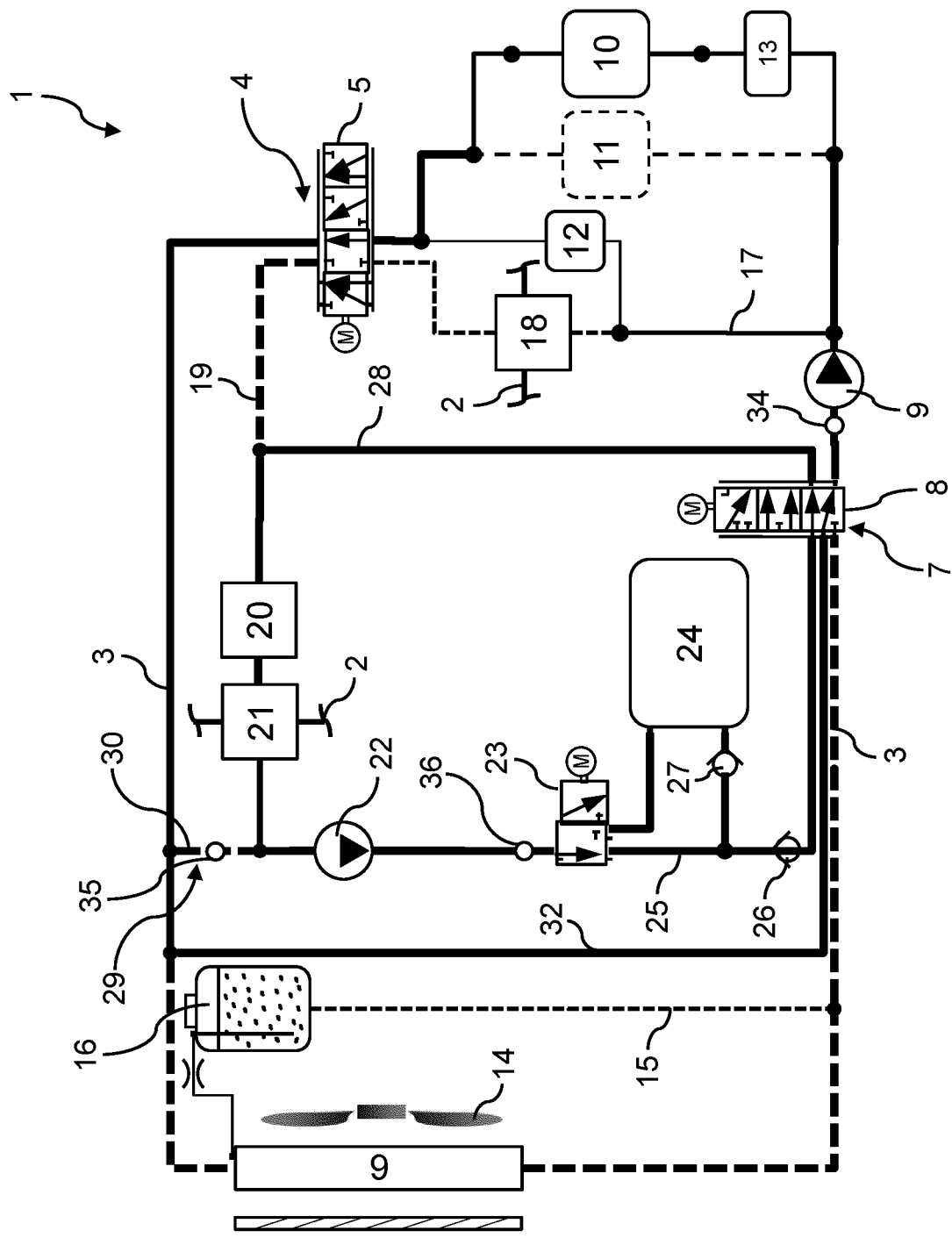
FIG. 10 shows a fifth operating state of the thermal management system.

FIG. 10 illustrates a fifth operating state on the basis of the temperature-control circuit 1. This operating state differs from the operating state from FIG. 8 only in that, in the fifth operating state, the first valve device 5 is in its second switching position, whereby the condenser line 17 is blocked.

Figure 11:
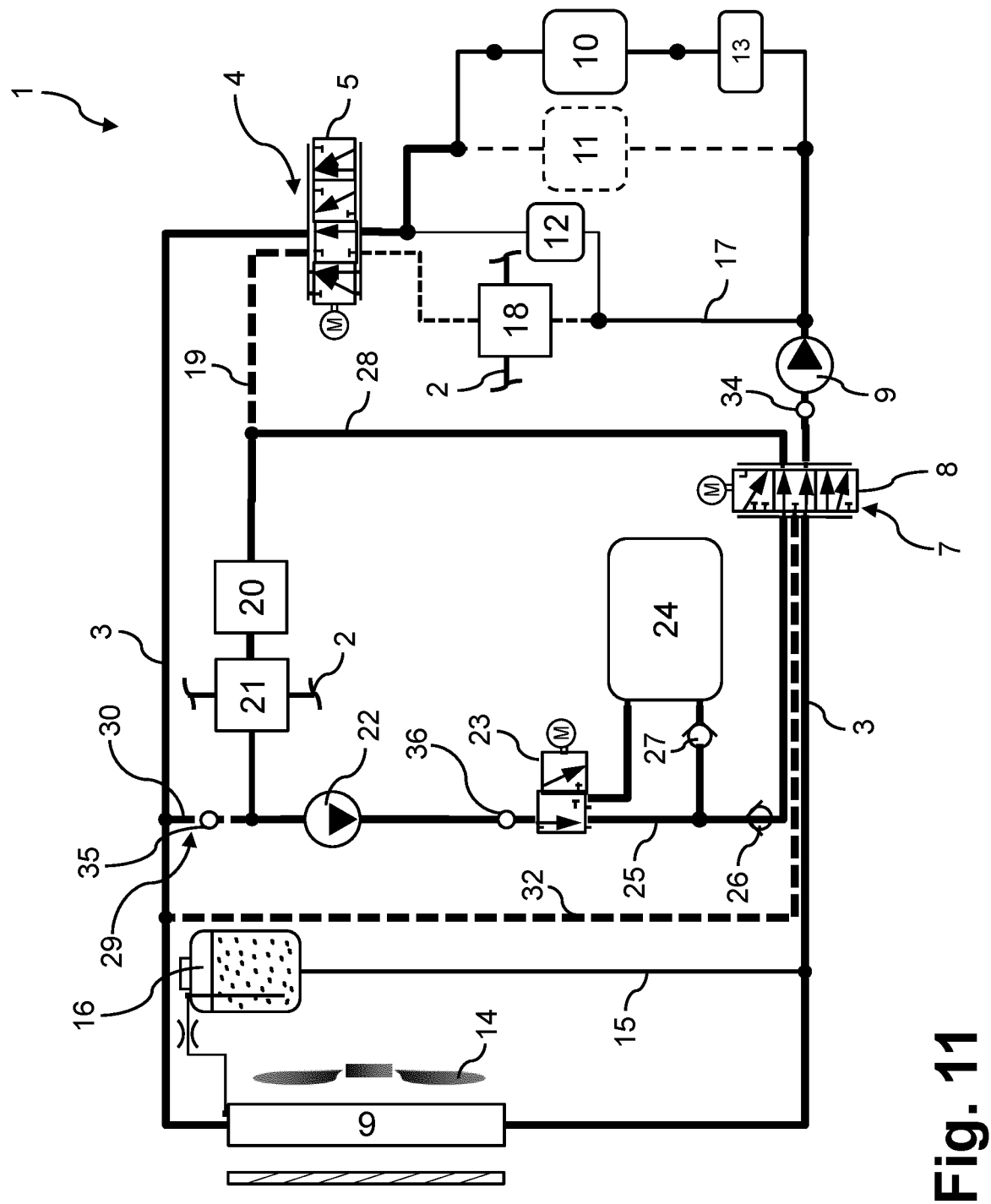
FIG. 11 shows a sixth operating state of the thermal management system.

FIG. 11 illustrates a sixth operating state on the basis of the temperature-control circuit 1. This operating state differs from the operating state from FIG. 9 only in that, in the fifth operating state, the first valve device 5 is in its second switching position, whereby the condenser line 17 is blocked.

Figure 12:
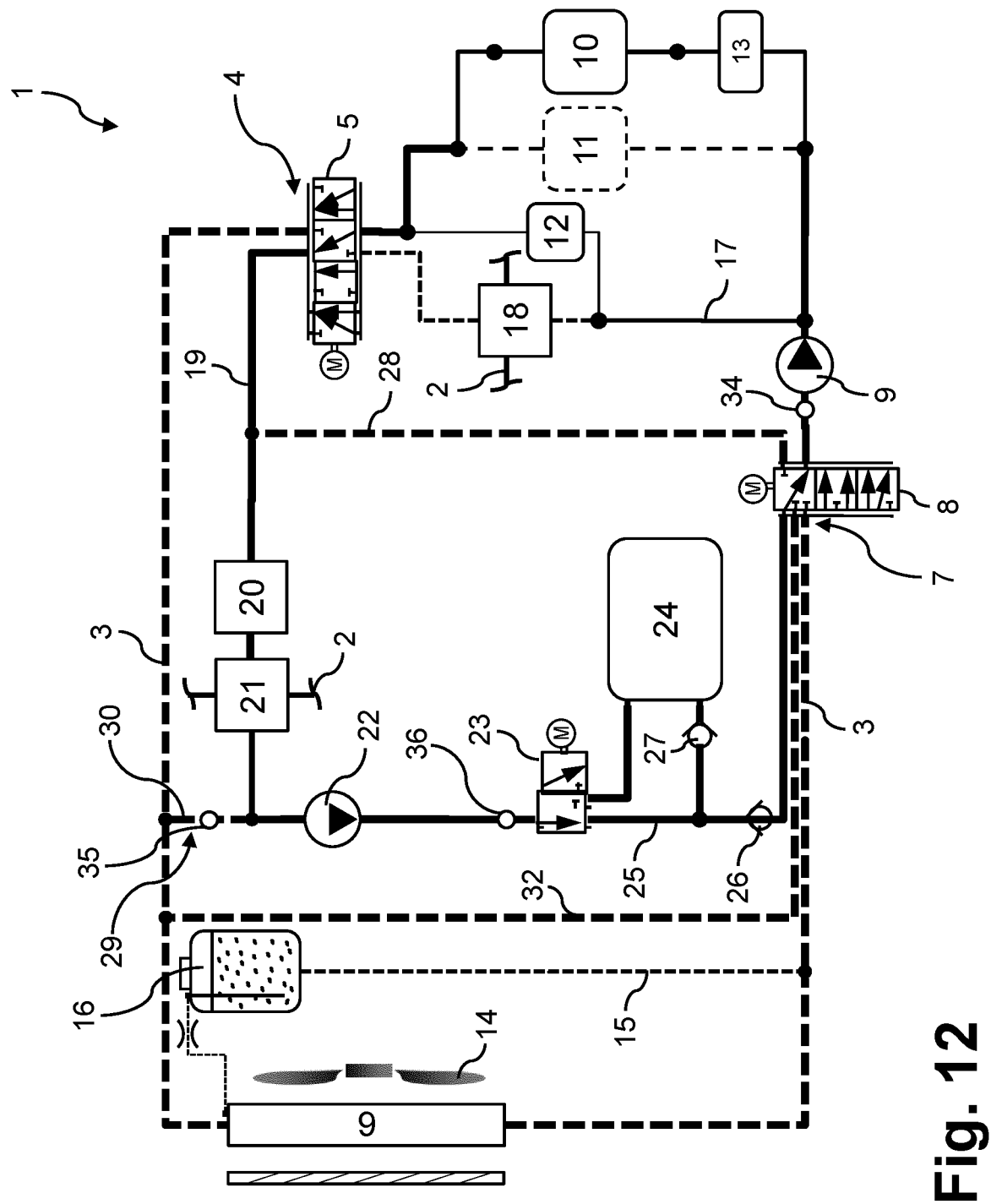
FIG. 12 shows a seventh operating state of the thermal management system.

FIG. 12 illustrates a seventh operating state on the basis of the temperature-control circuit 1. In this operating state, the first valve device 5 is in its third switching position, the second valve device 8 is in its first switching position, the motor-circuit pump 9 is active, and the battery pump 22 is active. Consequently, the condenser line 17 is blocked. The drive parallel connection, the battery line 19, the second valve device 8 and the motor-circuit pump 9 are connected in series to form a closed through-flowable circuit.

Flow through the radiator 6, the second radiator bypass 32 and the circulation line 28 is blocked.

With this operating state, it is possible, for example, by way of waste heat of the drive motor 10, to heat the traction battery 24 or the vehicle passenger compartment via the chiller 21, for example during travel under cold ambient conditions.

Figure 13:
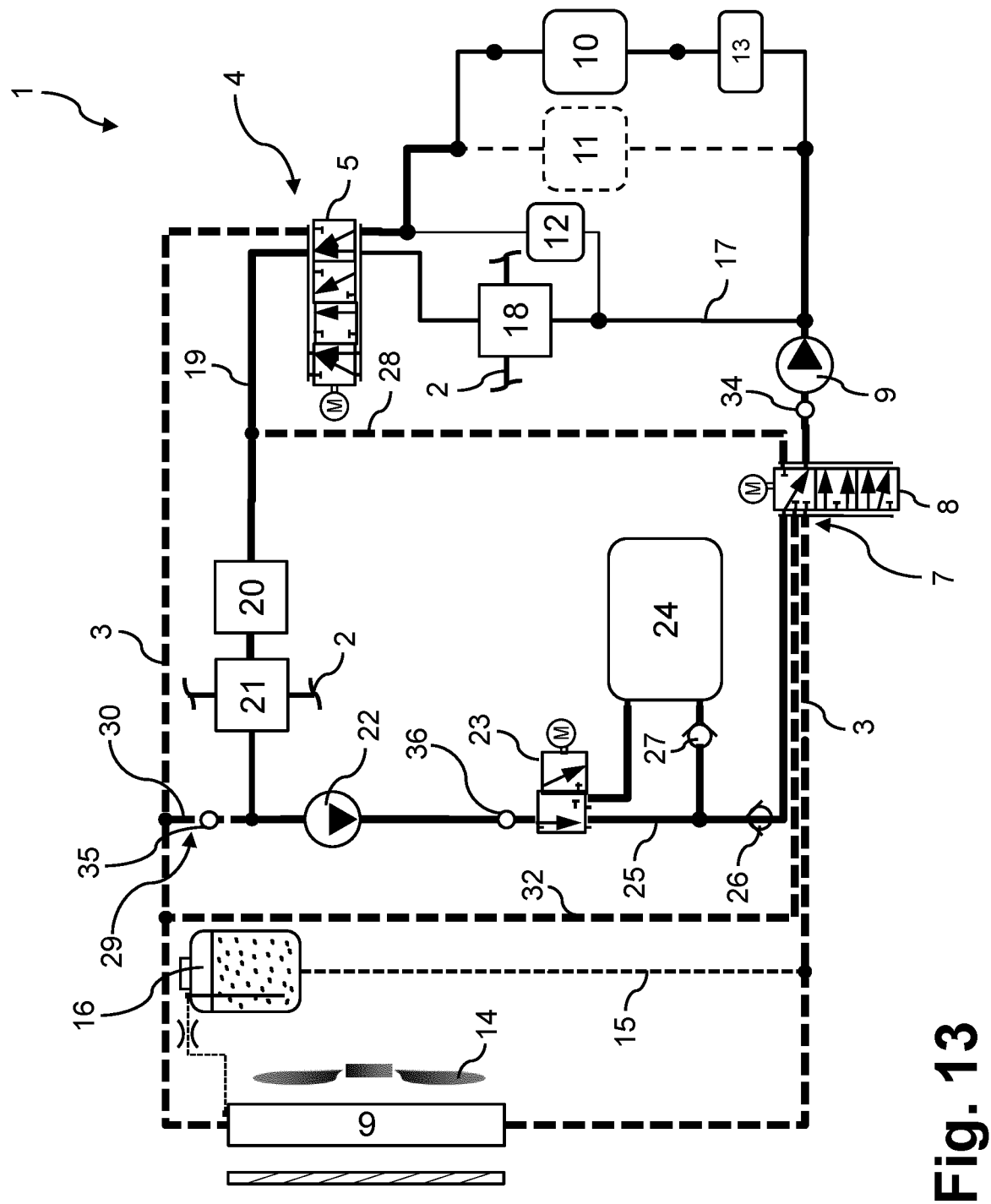
FIG. 13 shows an eighth operating state of the thermal management system.

FIG. 13 illustrates an eighth operating state on the basis of the temperature-control circuit 1. This operating state differs from the operating state from FIG. 12 only in that, in the eighth operating state, the first valve device 5 is in its fourth switching position, whereby the condenser 18 and the drive parallel connection are connected in parallel with one another. This condenser/drive parallel connection is in series with the battery line 19, etc., as described in FIG. 12.

Figure 14:
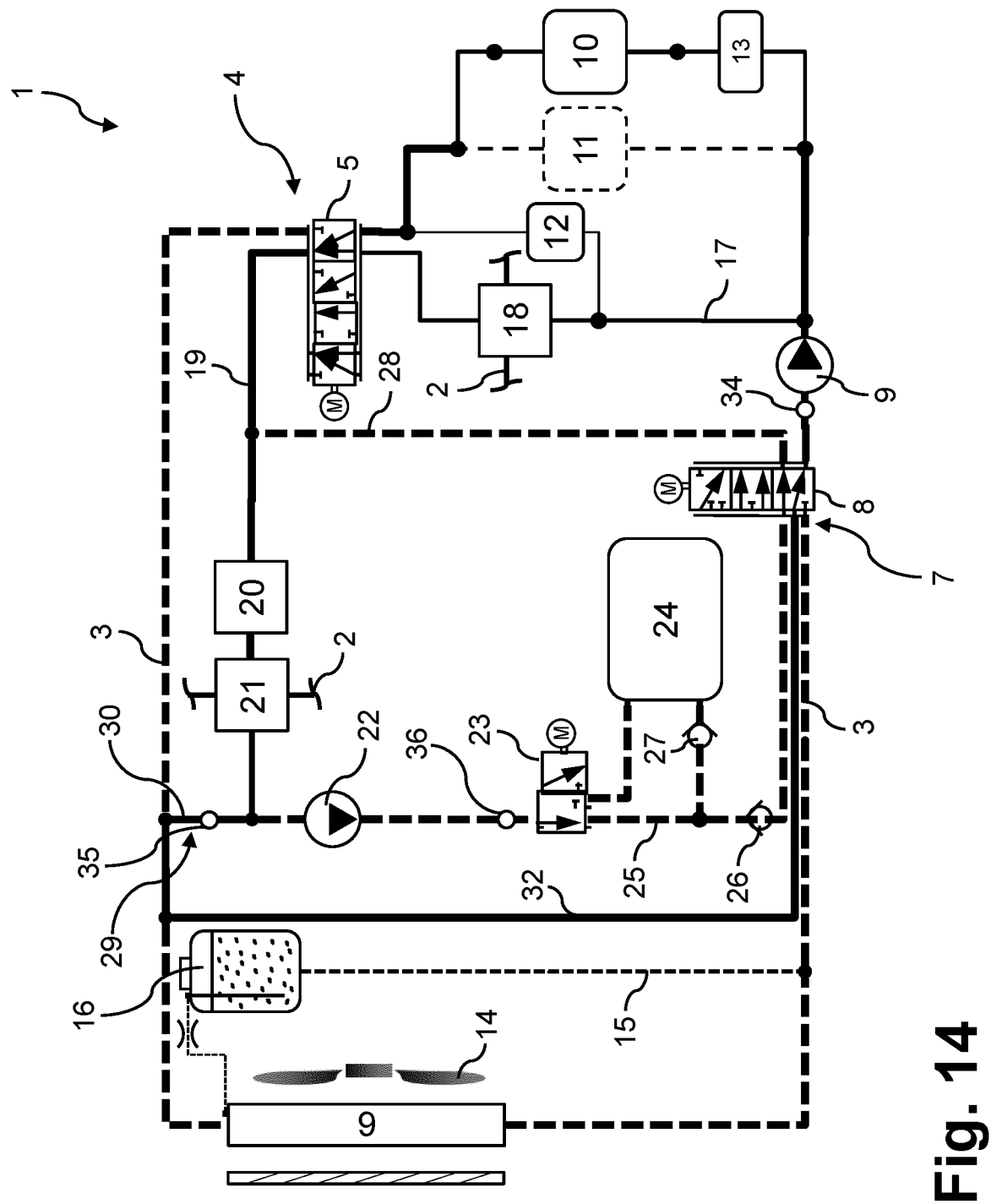
FIG. 14 shows a ninth operating state of the thermal management system.

FIG. 14 illustrates a ninth operating state on the basis of the temperature-control circuit 1. In this operating state, the first valve device 5 is in its fourth switching position, the second valve device 8 is in its third switching position, the motor-circuit pump 9 is active, and the battery pump 22 is not active. Consequently, the condenser 18 and the drive parallel connection are connected in parallel with one another. This condenser/drive parallel connection, the first valve device 5, the electric heater 20, the chiller 21, the third connection 29, the second radiator bypass 32, the second valve device 8 and the motor-circuit pump 9 are connected in series and form a closed circuit. Flow through the bypass/battery parallel connection, the radiator 6 and the circulation line 28 is blocked.

This operating state is used in particular if cooling or heating of the traction battery 24 is not required and waste heat of the condenser 18 and/or of the drive motor 10 is to be used for heating the vehicle passenger compartment (via the chiller 21). Through the use of the second radiator bypass 32, the waste heat of the condenser/drive parallel connection is kept in the temperature-control circuit 1 and is not released to the surroundings.

Figure 15:
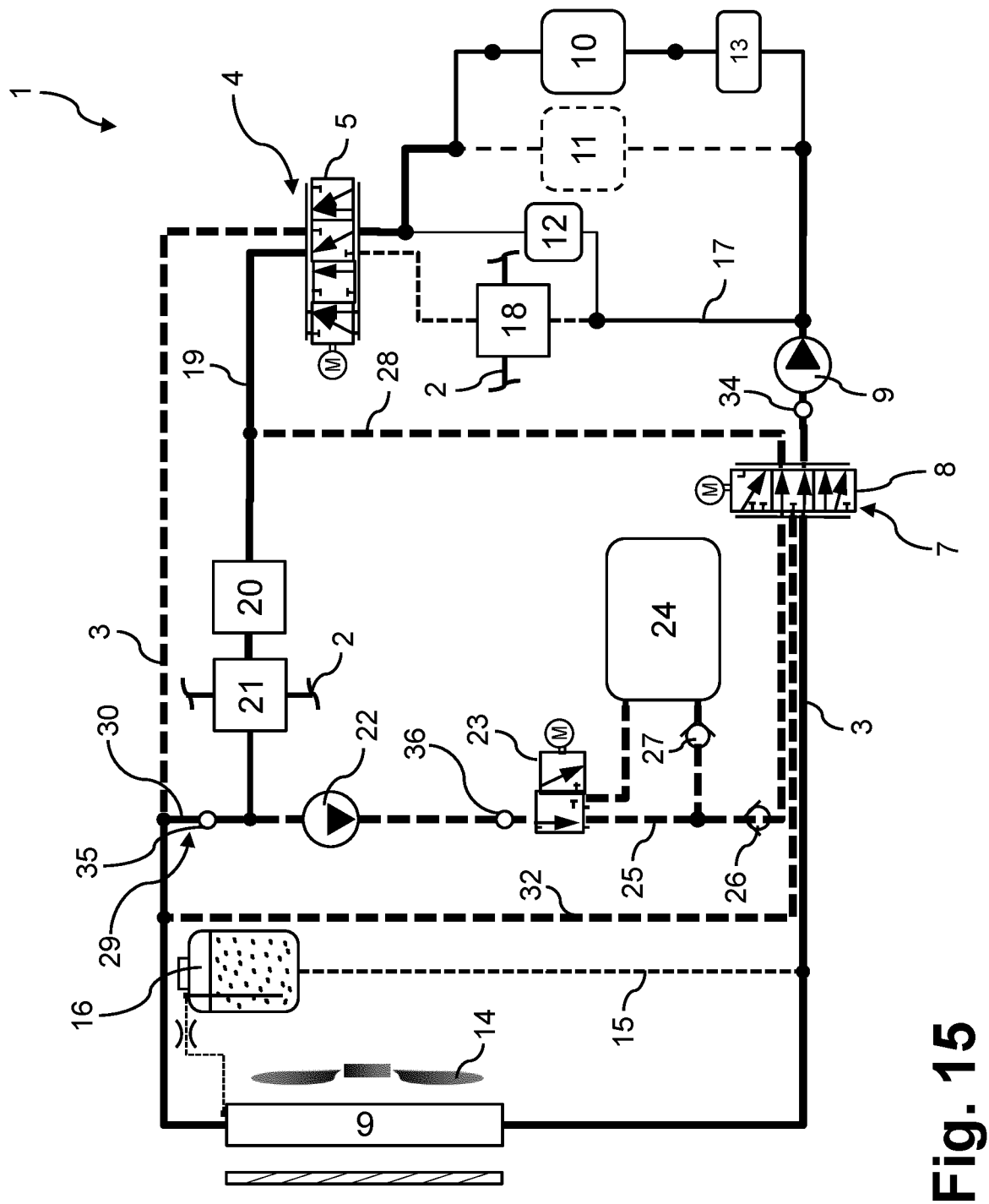
FIG. 15 shows a tenth operating state of the thermal management system.

FIG. 15 illustrates a tenth operating state on the basis of the temperature-control circuit 1. In this operating state, the first valve device 5 is in its third switching position, the second valve device 8 is in its second switching position, the motor-circuit pump 9 is active, and the battery pump 22 is not active. Consequently, the condenser line 17 is blocked. The drive parallel connection, the first valve device 5, the electric heater 20, the chiller 21, the third connection 29, the radiator 6, the second valve device 8 and the motor-circuit pump 9 are connected in series and form a closed circuit. Flow through the second radiator bypass 32, the bypass/battery parallel connection and the circulation line 28 is blocked.

Thus, this operating state differs from the operating state from FIG. 14 only in that, in the operating state from FIG. 15, the radiator 6 is flowed through and the second radiator bypass 32 is not used. This operating state is therefore used if heat energy is to be released to the surroundings via the radiator 6 because a surplus of heat is present in the temperature-control circuit 1.

Figure 16:
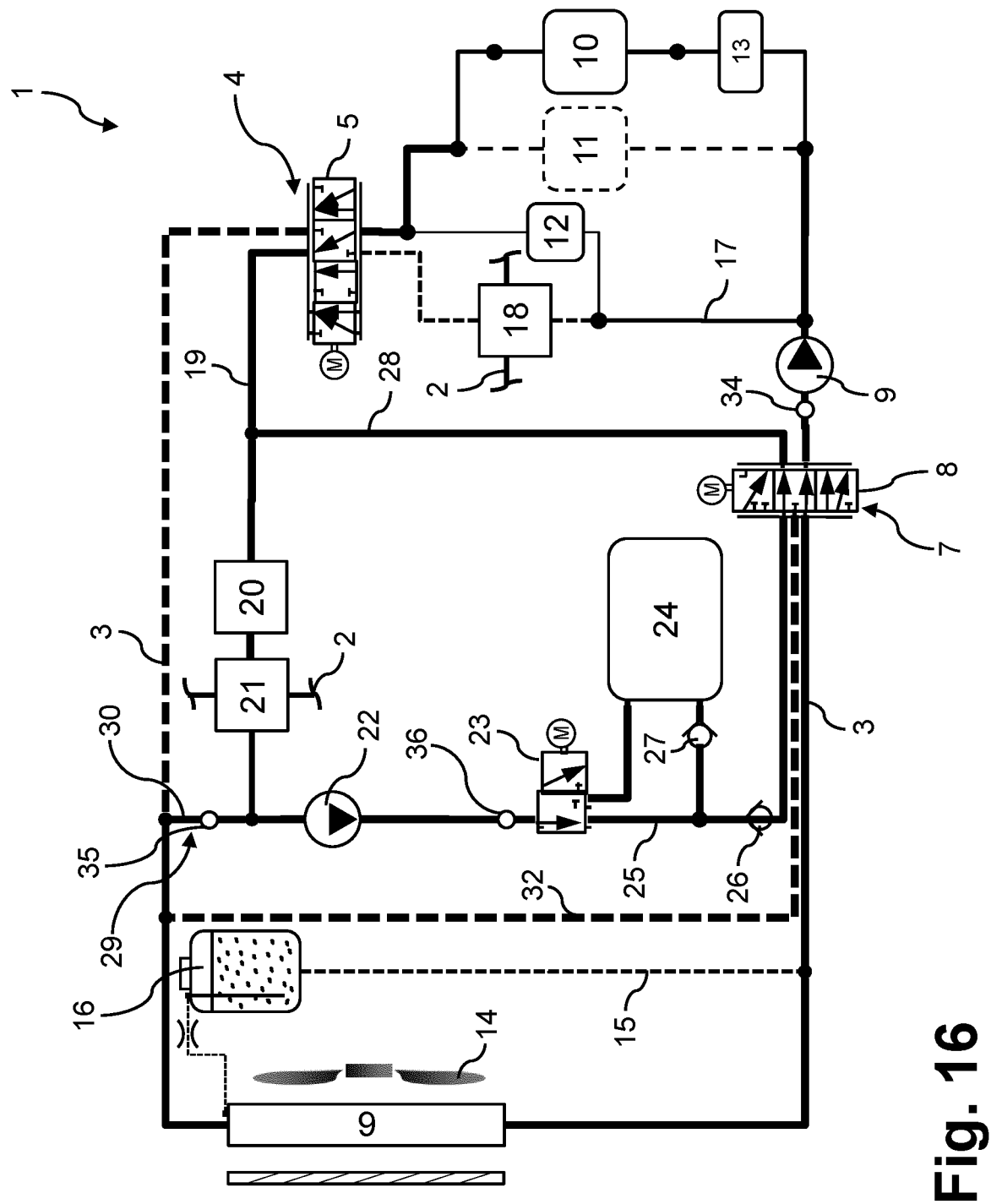
FIG. 16 shows an eleventh operating state of the thermal management system.

FIG. 16 illustrates an eleventh operating state on the basis of the temperature-control circuit 1. In this operating state, the first valve device 5 is in its third switching position, the second valve device 8 is in its second switching position, the motor-circuit pump 9 is active, and the battery pump 22 is active. Consequently, the condenser line 17 is blocked. The drive parallel connection, the first valve device 5, the electric heater 20, the chiller 21, the third connection 29, the radiator 6, the second valve device 8 and the motor-circuit pump 9 are connected in series and form a closed circuit. This circuit is connected to the simultaneously formed battery circuit 33 at the opening-in point of the circulation line 28 and at the third connection 29.

Flow through the second radiator bypass 32 is blocked.

Whilst the present disclosure has been illustrated and described in detail in the drawings and in the above description, this description is to be understood as being exemplary and not as being restrictive, and it is not intended to restrict the present disclosure to the exemplary embodiments disclosed. The mere fact that particular features are mentioned in different dependent claims is not intended to indicate that a combination of these features could not also be used in an advantageous manner.

LIST OF REFERENCE SIGNS

1 Temperature-control circuit
2 Refrigeration circuit
3 Motor circuit
4 First connection
5 First valve device
6 Radiator
7 Second connection
8 Second valve device
9 Motor-circuit pump
10 First drive motor
11 Second drive motor
12 First power-electronics component
13 Second power-electronics component
14 Fan
15 Expansion-tank line
16 Expansion tank
17 Condenser line
18 Condenser
19 Battery line
20 Electric heater
21 Chiller
22 Battery pump
23 Battery-bypass valve
24 Traction battery 25 Battery bypass
26 First one-way valve
27 Second one-way valve
28 Circulation line
29 Third connection
30 Connecting line
31 First radiator bypass
32 Second radiator bypass
33 Battery cooling circuit
34 Temperature sensor
35 Temperature sensor
36 Temperature sensor
37 One-way valve

The invention claimed is:

1. A thermal management system for a motor vehicle, comprising:
   a motor circuit in which at least one drive motor, a first connection, a radiator, a second connection, and a motor-circuit pump are arranged in series;
   a battery line comprising a chiller and, in series therewith, a bypass/battery parallel connection with a traction battery and with a battery bypass parallel thereto, wherein the chiller is configured to be flowed through from a refrigeration circuit fluidically separated from the battery line,
      wherein the first connection is arranged in the motor circuit downstream of the drive motor and upstream of the radiator, and wherein the first connection comprises a first valve device configured to selectively introduce coolant into the battery line,
      wherein the second connection is arranged downstream of the radiator and upstream of the drive motor, and wherein the second connection comprises a second valve device configured to selectively:
         conduct coolant to the drive motor; and/or
         connect the chiller and the traction battery to form a ring-like battery circuit,
   a third connection between the battery line and the motor circuit, wherein the chiller is arranged in the battery line between the first connection and the third connection,
      wherein a first radiator bypass is configured to be formed via the third connection, the battery bypass, and the second connection; and
   a second radiator bypass that branches off from the motor circuit downstream of the drive motor and upstream of the radiator and opens into the motor circuit downstream of the radiator and upstream of the drive motor.

2. The thermal management system according to claim 1, comprising:
   an electric heater arranged in the battery line.

3. The thermal management system according to claim 1, wherein the second radiator bypass is free of heat sinks or heat sources.

4. The thermal management system according to claim 1, wherein the second radiator bypass opens into the second connection.

5. The thermal management system according to claim 1, comprising:
   a battery pump arranged in the battery line.

6. The thermal management system according to claim 1, comprising:
   a condenser line that runs between the second connection and the first connection, wherein the condenser line has a condenser, wherein the condenser, fluidically separated from the condenser line, is configured to be flowed through from the refrigeration circuit.

7. The thermal management system according to claim 1, wherein the second valve device has at least three switching positions, wherein,
   in a first switching position, the battery line is connected in series with the drive motor;
   in a second switching position, the chiller and the bypass/battery parallel connection are able to be connected to form the battery circuit that is closed in a ring-like manner, and the second radiator bypass is blocked; and
   in a third switching position, the chiller and the bypass/battery parallel connection are able to be connected to form the battery circuit that is closed in a ring-like manner, and the second radiator bypass is connected in series with the drive motor.

8. A motor vehicle comprising:
   the thermal management system according to claim 1.

* * * * *